United States Patent [19]

James

[11] 4,159,043
[45] Jun. 26, 1979

[54] EXHAUST SYSTEM SUPPORT

[75] Inventor: Stanley E. James, Flint, Mich.

[73] Assignee: General Motors Corporation, Detroit, Mich.

[21] Appl. No.: 906,963

[22] Filed: May 18, 1978

[51] Int. Cl.² ............................................. B60K 13/04
[52] U.S. Cl. .................................. 180/64 A; 248/634
[58] Field of Search ............ 180/64 A, 54 A; 248/73, 248/74 R, 74 A, 49, 54 R, 65, 9, 8, 6

[56] References Cited

U.S. PATENT DOCUMENTS

| | | | |
|---|---|---|---|
| 2,160,808 | 6/1939 | Bradley | 180/64 A |
| 2,308,969 | 1/1943 | Riesing | 248/54 R |
| 3,204,901 | 9/1965 | Dunn | 180/64 A X |
| 3,942,599 | 3/1976 | Shimada | 180/64 A |
| 3,944,177 | 3/1976 | Yoda | 248/74 A |
| 3,963,087 | 6/1976 | Grosseau | 180/64 A |
| 4,114,715 | 9/1978 | Theron | 180/64 A |

Primary Examiner—Joseph F. Peters, Jr.
Assistant Examiner—Milton L. Smith
Attorney, Agent, or Firm—J. C. Evans

[57] ABSTRACT

An exhaust system for a front mounted, transverse engine includes an exhaust pipe and tailpipe assembly having an interposed low profile gas converter therebetween supported by a pair of pedestal type suspension assemblies and a converter support bar directed transversely below the converter and wherein each of the suspension assemblies includes a resiliently yieldable insulator of elastomeric material vertically compressed by the supported exhaust system and including a cylindrical hollow end slidably fitted over a converter bar end to vertically support the bar on a vehicle frame and further including a thin web segment that readily bends on either side of the at rest vertical axis of the insulator to accommodate fore and aft engine induced roll movements while serving to isolate inherent exhaust noise transmission from the exhaust system to the vehicle frame or body.

2 Claims, 7 Drawing Figures

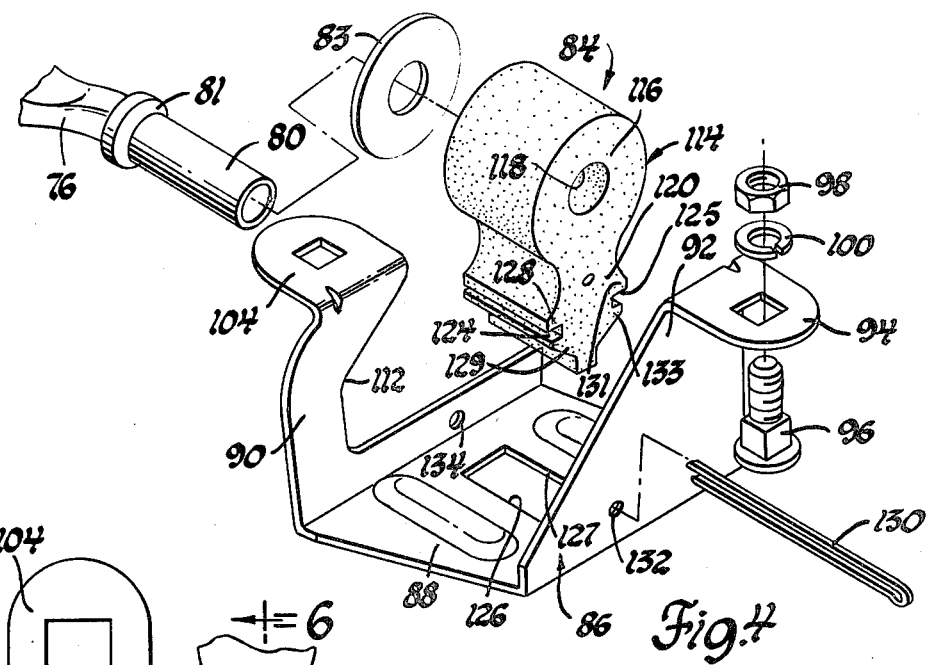
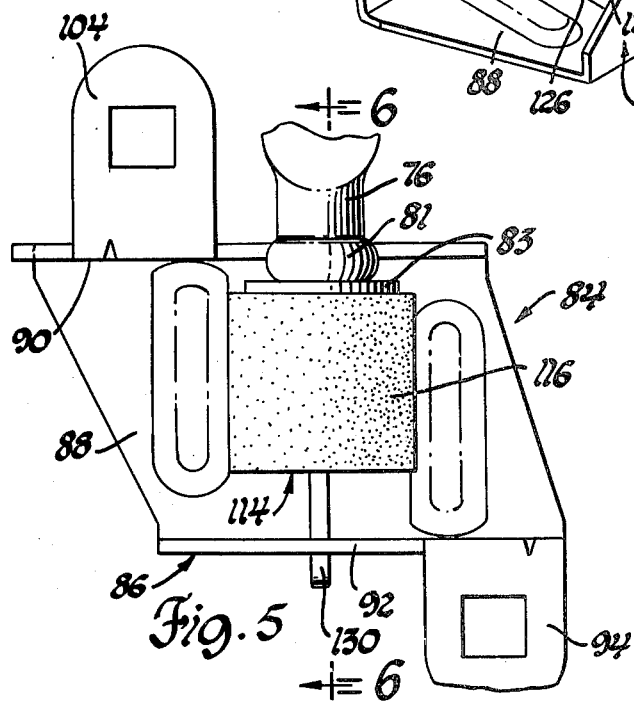
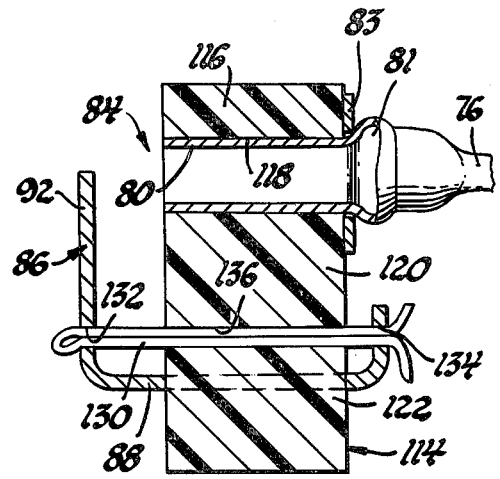
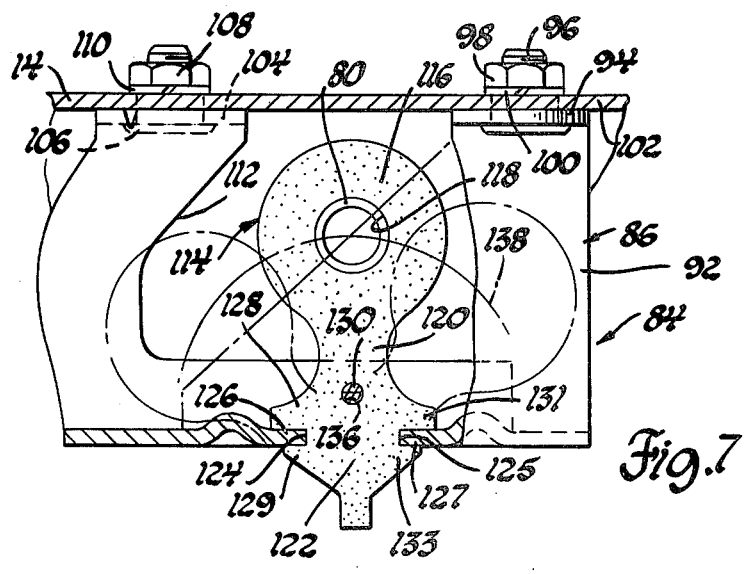

EXHAUST SYSTEM SUPPORT

Resilient support system for exhaust pipe and muffler arrangement are well known. Examples of such arrangements are set forth in U.S. Pat. No. 2,160,808, issued June 6, 1939, to D. T. Bradley and U.S. Pat. No. 2,308,969, issued Jan. 19, 1943, to E. F. Riesing. Such arrangements include vertical hangers that yield to accommodate fore and aft movement of an exhaust pipe with respect to a frame member.

Another example of a resilient vehicle exhaust pipe support is set forth in U.S. Pat. No. 3,204,901, issued Sept. 7, 1965, which includes a pair of elastomeric rings that yield to accommodate transverse movement as well as fore and aft movement of a supported exhaust pipe located longitudinally beneath a floor pan of a vehicle.

While such arrangements are suitable for their intended purpose, they are not adapted for use with exhaust and converter systems in a vehicle having a front mounted transverse engine. Such engines have a roll axis which is arranged perpendicularly of the longitudinal axis of the vehicle frame. Because of this arrangement, the exhaust system is subjected to a combination of fore and aft and up and down movements transmitted from the engine. The down movements of such exhausts, in particular, are restrained by overhead hangers of the type set forth in the aforementioned prior art patents.

Accordingly, an object of the present invention is to provide an improved exhaust system for a vehicle having a front mounted transverse engine with a roll axis that subjects the leading edge of an exhaust pipe to a combination of fore and aft and up and down movements including a pair of side mounted pedestal supports and a converter bar directed transversely of the vehicle frame and each pedestal having a resiliently yieldable insulator including one end interlockingly connected to a frame component and an opposite cylindrical hollow rod support end slidably fitted over one of the ends of the transverse support bar for the exhaust system to vertically support the bar with respect to the vehicle frame and wherein each of the insulators is maintained in compression by the weight of the exhaust system and with a thin web section on each insulator bending on either side of the vertical axis of the insulator along an arcuate line to permit unrestrained fore and aft and up and down movements of the trailing edge of the exhaust pipe while further serving to isolate engine exhaust noise transmission from the transverse support bar to the engine frame via the insulators.

Another object of the present invention is to provide an improved exhaust and catalytic converter support system for a vehicle having a front mounted transversely located engine with a roll axis arranged perpendicularly to the longitudinal axis of the vehicle frame to subject a leading edge of the exhaust pipe to a combination of fore and aft and up and down movements that are transmitted to the trailing edge of the exhaust pipe, the improved system including a low profile exhaust gas converter having its inlet connected to the exhaust pipe and an outlet connected both to a tailpipe and to a converter support bar located below the converter; the bar being directed transversely of the longitudinal axis of the vehicle frame and connected at opposite ends thereon to a pair of suspension assemblies each including means to permit the converter to freely move downwardly toward the vehicle frame in response to transient fore and aft engine induced roll movements in the exhaust system while including resilient insulator means maintained under compression when the converter position is at rest thereby to maintain the converter at a predetermined vertical and fore and aft design position with respect to the vehicle frame and wherein the insulator means include a thin sectioned web between the converter support bar and vehicle frame to isolate exhaust noise transmission from the engine to the engine frame.

Still another object of the present invention is to provide an improved exhaust catalytic converter support system for a vehicle having a front mounted transverse engine with a roll axis arranged perpendicularly to the longitudinal axis of the vehicle frame to subject a leading edge of an exhaust pipe to a combination of fore and aft and up and down movements with respect to the trailing edge of an exhaust pipe and wherein a low profile exhaust gas converter has its inlet connected to the exhaust pipe and an outlet connected to a muffler and tailpipe and a separate lower converter shield member is located below the exhaust gas converter in spaced relationship thereto having a saddle configured front edge and a rear edge flange thereon; and wherein means are provided to fixedly couple the exhaust pipe to the inlet of the converter while concurrently fixedly securing the front edge of the shield member to said converter inlet and wherein a converter support bar is directed transversely of the longitudinal axis of the vehicle frame below the converter shield where it is fixedly secured at its center to the rear edge flange of the shield and also to the outlet of the converter; and wherein each end of the support bar is secured by means of an elastomeric yieldable insulator including a bayonet end interlockingly connected to a frame support bracket and a cylindrical hollow rod support end slidably fitted over one of the opposite ends of the converter support bar and wherein a thin web section is formed between each bayonet end and rod support end to define a normal pedestal support maintained under compression by the weight of the exhaust system when the converter is at rest and bending fore and aft of the at rest vertical axis of the insulator to allow movement of the opposite ends of the converter support bar along a swing arc that permits unrestricted movement of the complete system through a combined fore and aft and up and down rolling movement produced by the transverse engine while concurrently serving to isolate engine exhaust noise transmission from the converter bar to the vehicle frame.

Further objects and advantages of the present invention will be apparent from the following description, reference being had to the accompanying drawings wherein a preferred embodiment of the present invention is clearly shown and:

FIG. 4 is an exploded view of component parts of pedestal type suspension in the present invention;

FIG. 5 is a top elevational view of the component parts of the suspension in FIG. 4;

FIG. 6 is a cross sectional view taken along the line 6—6 of FIG. 5 looking in the direction of the arrows; and FIG. 7 is a side elevational view of the insulator assemblies as shown in FIGS. 4 through 6.

Figure 1:
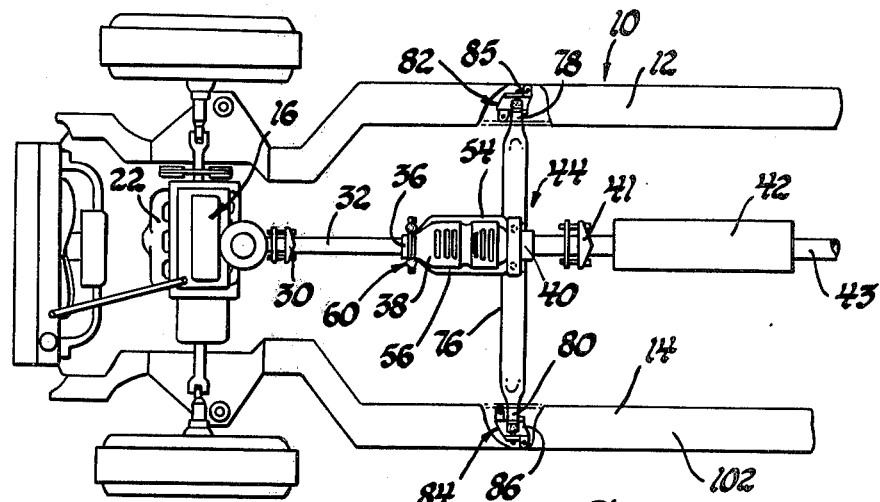
FIG. 1 is a view in top elevation of an exhaust and converter support system constructed in accordance with the present invention.
Figure 3:
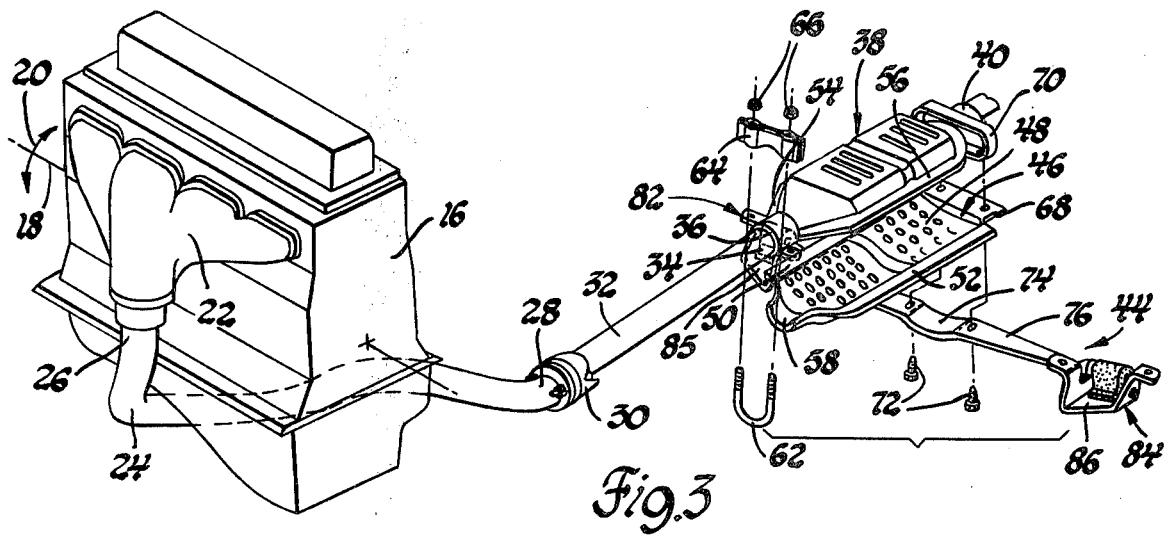
FIG. 3 is a view in perspective showing a converter and associated support components in an exploded relationship.

Referring now to the drawings, in FIG. 1, a vehicle chassis 10 is illustrated including either an integral body or side frame members 12, 14. A transverse engine 16 is mounted forwardly of the chassis 10. The engine 16 includes a roll axis 18 about which the engine rolls as shown by the arrows 20 in FIG. 3. The engine includes an exhaust manifold 22 connected to an exhaust pipe 24 at the inlet end 26 thereof.

During the aforesaid roll movement, the exhaust pipe inlet end 26 is subjected to a combination of fore and aft movements and up and down movements with respect to the frame members 12 and 14 or equivalent body components. This combination of fore and aft and up and down movements is transmitted to the outlet end 28 of the exhaust pipe 24 which is connected by means of a suitable flexible coupling 30, for example, of the type set forth in our copending U.S. Ser. No. 803,526, filed June 6, 1977. The coupling 30 connects the outlet 28 of the exhaust pipe to a pipe section 32 having its outlet 34 coupled to an inlet collar 36 on a low profile exhaust gas catalytic converter 38 having an outlet 40 thereon connected by a coupling 41, like coupling 30, to a muffler 42 and a tailpipe 43 that is directed rearwardly of the chassis 10 as shown in FIG. 1.

In such arrangements, the roll movement of the transversely mounted engine 16 is transmitted through all components of the exhaust system including the converter 38 and the trailing tail pipe 43. Accordingly, the present invention includes an improved exhaust system support assembly 44 made up in part of a separate, lower converter shield member 46 having a concave, perforated inner surface 48 thereon and a pair of flat side flanges 50, 52 that supportingly receive side flanges 54, 56 on the converter 38 to maintain the bottom of the converter 38 in spaced relationship to the separate lower converter shield member 46.

Furthermore, the shield member 46 includes a saddle configured inlet end 58 that supportingly receives the inlet collar 36 on the converter 38 along with the pipe outlet 34. The saddle 58, collar 36 and pipe outlet 34 are clamped together by means of a U-bolt clamp assembly 60 including a U-bolt component 62 that has threaded ends directed through a clamp plate 64 which is held securely against the upper surface of collar 36 by suitable means shown as a pair of nut retainers 66.

Additionally, the separate shield member 46 includes an aft flange 68 thereon. Bolt holes in the aft flange 68 are aligned with bolt holes in a rebent flange 70 on the converter outlet 40 to receive a pair of fasteners 72 that are directed through the center segment 74 of a transversely directed catalytic converter support bar 76. The support bar 76 has tubular rod ends 78, 80 located adjacent the side frames 12, 14, respectively. Each of the tubular rod ends 78, 80 has a stop shoulder 81 and washer 83 directed into supported relationship with an adjacent resilient pedestal type suspension 82, 84 with frame brackets 85, 86, respectively.

As shown in FIG. 4, frame bracket 86 includes a base plate 88 and a pair of upstanding side braces 90, 92. The brace 92 includes an outwardly bend tab 94 thereon through which a bolt 96 is directed to be secured by means of a nut and lock washer 98, 100 to the top wall 102 of the side frame 14. A bent tab 104 on the brace 90 is secured by means of a bolt 106 and a nut 108 and lock washer 110 to wall 102 inboard of side frame 14.

The brace 90 includes an undercut side edge 112 thereon to provide relief for movement of the rod end 80 forwardly with respect to the side frame 14.

More particularly, the resilient suspension system 82 includes an elastomeric insulator member 114 having a tubular hollow rod support end 116 thereon with a central opening 118 that slidably supports the rod end 80. The hollow rod support end 116 is joined by a thin web section 120 to bayonet configured end 122 having side grooves 124, 125 thereon which supportingly receive edge segments 126, 127 of the base plate 88. Pairs of shoulders 128, 129 and 131, 133 on the bayonet end 122 interlockingly connect between opposite faces of the segments 126, 127 to secure the insulator member 114 on the base plate 88.

Additionally, a cotter pin 130 is directed through aligned openings 132, 134 in the frame bracket 86 and a connector opening 136 through the insulator member 114 at a transition point between the thin web section 120 and the bayonet portion 122 as best shown in FIGS. 6 and 7.

While the component parts of the resilient suspension unit 84 have been illustrated in FIGS. 4 through 7, like component parts exist in the resilient suspension unit 82 on the frame member 12.

Figure 2:
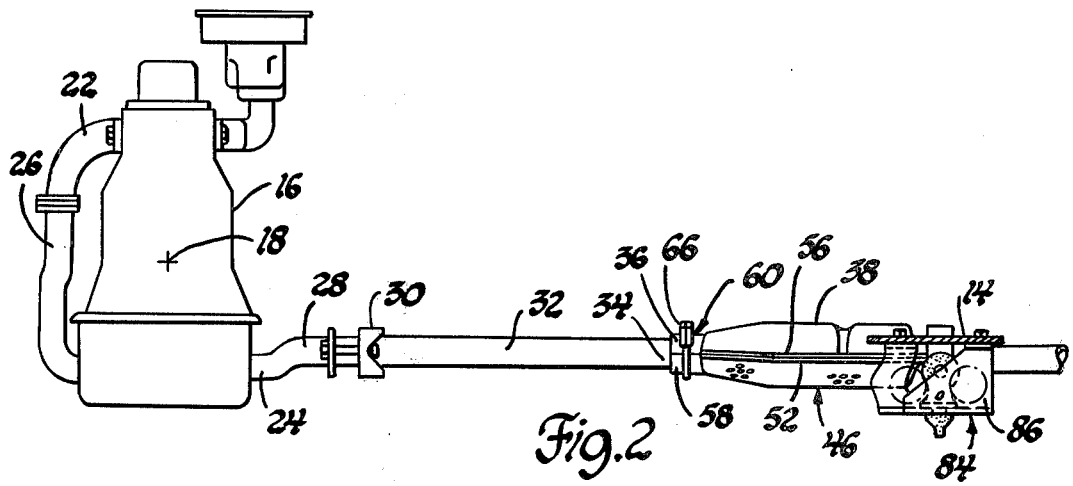
FIG. 2 is a side elevational view of the exhaust and converter support system of the present invention.

Accordingly, each end of the transversely directed converter support bar 76 is arranged to transfer the distributed weight of the exhaust system components, including the exhaust pipe 24, pipe segment 32, converter assembly 38 and tailpipe 43 and muffler 42 to the resilient suspension units 82, 84 and the insulators 114 thereon which serve as pedestal supports to carry such distributed weight vertically with respect to the side frame members 12, 14 and wherein the elastomeric material of each of the insulators 114 is maintained in compression when the converter 38 is in an "at rest" position as shown in FIGS. 1 and 2.

During engine operation, the transverse engine 16 will produce a roll movement as shown by the arrows 20 about the roll axis 18. This will produce a movement of each of the rod ends 78, 80 along an arc represented by the line 138 in FIG. 7. In accordance with certain principles of the present invention, the insulators 114 readily bend at the thin web section 120 both fore and aft of the at rest vertical axis of the insulator 114. Fore and aft movement of the converter assembly 38 and the associated exhaust system components are maintained since the spring rate of insulator 114 is less in its fore and aft shifted positions. Also, there is freedom of movement of the exhaust when moved downward vis-a-vis the frames 12, 14.

Moreover, the resiliently yieldable insulator 114 in each of the suspension units 82, 84 further serves to isolate transfer of engine exhaust noise from the exhaust system to the frame members. The units 82, 84 are located away from the heat radiation from converter 38.

In one working embodiment, the insulators 114 are made of 40 durometer butyl rubber. Frame components can be replaced by integral body portions on either side of an underbody tunnel if desired.

The illustrated resilient suspension units 82, 84 are further characterized by returning the converter assembly to a desired "at rest" position with respect to the underside of the vehicle body when the vehicle is at rest to assure the desired spacing between the converter assembly and other component parts of the vehicle.

While the embodiments of the present invention, as herein disclosed, constitute a preferred form, it is to be understood that other forms might be adopted.

The embodiments of the invention in which an exclusive property or privilege is claimed are defined as follows:

1. An exhaust and converter support system for a vehicle having a front mounted transverse engine with a roll axis arranged perpendicularly to the longitudinal axis of the vehicle chassis subjecting the leading edge of an exhaust pipe to a combination of fore and aft and up and down movements transmitted to the trailing edge of the exhaust pipe comprising: a low profile exhaust gas catalytic converter having an inlet and an outlet, means for fixedly coupling said exhaust pipe to the inlet of said converter, a converter support bar directed transversely of the longitudinal axis of the vehicle chassis, means for fixedly securing the center of said bar to the outlet of said converter, and a pair of suspension assemblies coupling opposite ends of said converter bar to the vehicle chassis to accommodate transient fore and aft engine induced roll movements while maintaining said converter at a predetermined vertical and fore and aft design position following engine operation, each of said suspension assemblies including a rigid converter support bracket, means for fixedly securing said support bracket to the vehicle chassis, a resiliently yieldable insulator of elastomeric material including a bayonet end thereon interlockingly connected to said bracket, and a cylindrical hollow rod support end slidably fitted over one of said opposite ends to permit roll movement of said bar with respect to the vehicle chassis and a thin web segment connecting said bayonet end and said rod support end whereby the insulator will maintain a normal pedestal support of the vertical weight of the exhaust system wherein the elastomeric material is in compression while allowing the complete system to move without restricting the fore and aft movements of the engine and coupled exhaust pipes whereby the web section is bent to reduce the spring rate of the insulator thereby serving to isolate inherent exhaust noise transmission from the converter bar to the vehicle chassis via the suspension assemblies.

2. An exhaust and converter support system for a vehicle having a front mounted transverse engine with a roll axis arranged perpendicularly to the longitudinal axis of the vehicle chassis subjecting the leading edge of an exhaust pipe to a combination of fore and aft and up and down movements transmitted to the trailing edge of the exhaust pipe comprising: a low profile exhaust gas catalytic converter having an inlet and an outlet, a separate lower converter shield member having a saddle configured front edge and a rear edge flange thereon, means for fixedly coupling said exhaust pipe to the inlet of said converter and concurrently fixedly securing the front edge of said shield member to said converter inlet, a converter support bar directed transversely of the longitudinal axis of the vehicle chassis, means for fixedly securing the center of said bar to said rear edge flange and to the outlet of said converter, and a pair of suspension assemblies coupling opposite ends of said converter bar to the vehicle chassis to accommodate transient fore and aft engine induced roll movements while maintaining said converter at a predetermined vertical and fore and aft design position following engine operation, each of said suspension assemblies including a rigid converter support bracket, means for fixedly securing said support braket to the vehicle chassis, a resiliently yieldable insulator of elastomeric material including a bayonet end thereon interlockingly connected to said bracket, and a cylindrical hollow rod support end slidably fitted over one of said opposite ends to permit roll movement of said bar with respect to the vehicle chassis and a thin web segment connecting each of said bayonet ends and said rod support end whereby the insulator will maintain a normal pedestal support of the vertical weight of the exhaust system whereby the elastomeric material is in compression while allowing the complete system to move without restricting the fore and aft movements of the engine and coupled exhaust pipes whereby the web section is bent to reduce the spring rate of the insulator thereby serving to isolate inherent exhaust noise transmission from the converter bar to the engine chassis via the suspension assemblies.

* * * * *